United States Patent
Jung et al.

(10) Patent No.: US 9,413,495 B2
(45) Date of Patent: Aug. 9, 2016

(54) DELAYED ACKNOWLEDGEMENT TRANSMISSION METHOD AND APPARATUS IN MOBILE COMMUNICATION SYSTEM

(75) Inventors: Jungsoo Jung, Seongnam-si (KR); Youngyong Kim, Seoul (KR); Woojin Ahn, Seoul (KR); Gangjin Yoon, Seoul (KR)

(73) Assignees: Samsung Electronics Co., Ltd., Suwon-si (KR); Industry-Academic Cooperation Foundation, Yonsei Univ., Seoul (KR)

( * ) Notice: Subject to any disclaimer, the term of this patent is extended or adjusted under 35 U.S.C. 154(b) by 4 days.

(21) Appl. No.: 13/463,239

(22) Filed: May 3, 2012

(65) Prior Publication Data
US 2012/0281570 A1 Nov. 8, 2012

(30) Foreign Application Priority Data
May 3, 2011 (KR) .................. 10-2011-0041866

(51) Int. Cl.
| | | |
|---|---|---|
| *H04L 12/16* | (2006.01) | |
| *H04L 1/18* | (2006.01) | |
| *H04W 36/00* | (2009.01) | |

(52) U.S. Cl.
CPC ......... *H04L 1/1854* (2013.01); *H04W 36/0011* (2013.01)

(58) Field of Classification Search
CPC .................................................. H04W 36/16
USPC ........................................ 370/331; 455/436
See application file for complete search history.

(56) References Cited

U.S. PATENT DOCUMENTS

| | | | | |
|---|---|---|---|---|
| 6,611,688 | B1* | 8/2003 | Raith ............... | H04W 4/02 340/992 |
| 8,249,585 | B2* | 8/2012 | Tronc .............. | H04B 7/18563 370/453 |
| 8,576,797 | B2* | 11/2013 | Jang ................ | H04W 36/02 370/331 |
| 2005/0221824 | A1* | 10/2005 | Lee ................. | H04W 36/0066 455/435.2 |
| 2006/0073828 | A1* | 4/2006 | Sipila .............. | H04W 36/12 455/436 |
| 2008/0108354 | A1* | 5/2008 | Nagata ............ | H04W 36/02 455/438 |
| 2008/0130585 | A1* | 6/2008 | Park ................ | H04W 36/0083 370/332 |
| 2008/0167043 | A1* | 7/2008 | Sipila .............. | H04W 36/12 455/436 |

(Continued)

*Primary Examiner* — Khaled Kassim
*Assistant Examiner* — Berhanu Belete
(74) *Attorney, Agent, or Firm* — Jefferson IP Law, LLP

(57) ABSTRACT

A delayed acknowledgement transmission method and an apparatus are provided for improving communication performance of a system and a terminal by delaying an ACKnowledgement (ACK) transmission of the terminal in a handover procedure. The method includes transmitting an acknowledgement corresponding to a segment immediately upon receipt of the segment, detecting a delay condition event which is triggered when a difference between a signal strength of the source base station and a neighboring base station is equal to or greater than a predefined offset, calculating a delay value for delaying acknowledgement transmission corresponding to the segment received after detecting the delay condition event, and transmitting the segment received after the detection of the delay condition event by delaying by as much as a time corresponding to the delay value. The apparatus is capable of avoiding a router's performance degradation and reducing a packet transmission delay and packet loss.

8 Claims, 8 Drawing Sheets

(56) References Cited

U.S. PATENT DOCUMENTS

| | | | | |
|---|---|---|---|---|
| 2009/0028091 A1* | 1/2009 | Dimou | ............ | H04W 48/20 |
| | | | | 370/328 |
| 2009/0154424 A1* | 6/2009 | Oyabu | ............ | H04W 36/38 |
| | | | | 370/331 |
| 2009/0163207 A1* | 6/2009 | Randall | ............ | H04W 36/38 |
| | | | | 455/436 |
| 2009/0175241 A1* | 7/2009 | Ohta | ............ | H04W 36/02 |
| | | | | 370/331 |
| 2009/0185539 A1* | 7/2009 | Ohta | ............ | H04W 36/02 |
| | | | | 370/331 |
| 2009/0290554 A1* | 11/2009 | Siltala | ............ | H04W 36/0066 |
| | | | | 370/331 |
| 2009/0318156 A1* | 12/2009 | Ode | ............ | H04W 36/30 |
| | | | | 455/438 |
| 2010/0113051 A1* | 5/2010 | Du | ............ | H04W 72/1278 |
| | | | | 455/450 |
| 2010/0130208 A1* | 5/2010 | Hayashi | ............ | H04W 36/02 |
| | | | | 455/436 |
| 2010/0142485 A1* | 6/2010 | Lee | ............ | H04W 36/02 |
| | | | | 370/331 |
| 2011/0038264 A1* | 2/2011 | Ishii | ............ | 370/238 |
| 2011/0044285 A1* | 2/2011 | Jang | ............ | H04W 36/02 |
| | | | | 370/331 |
| 2011/0080895 A1* | 4/2011 | Iwamura | ............ | H04W 36/0083 |
| | | | | 370/332 |
| 2011/0176593 A1* | 7/2011 | Hultell | ............ | H04B 7/0404 |
| | | | | 375/224 |
| 2012/0008524 A1* | 1/2012 | Amirijoo | ............ | H04W 24/10 |
| | | | | 370/252 |
| 2012/0230219 A1* | 9/2012 | Pettersson | ............ | H04W 36/24 |
| | | | | 370/252 |
| 2012/0275434 A1* | 11/2012 | Ode | ............ | H04W 36/30 |
| | | | | 370/331 |
| 2012/0327803 A1* | 12/2012 | Lee | ............ | H04W 72/1221 |
| | | | | 370/252 |
| 2013/0028236 A1* | 1/2013 | Jung | ............ | H04W 36/0072 |
| | | | | 370/331 |

* cited by examiner

DELAYED ACKNOWLEDGEMENT TRANSMISSION METHOD AND APPARATUS IN MOBILE COMMUNICATION SYSTEM

PRIORITY

This application claims the benefit under 35 U.S.C. §119(a) of a Korean patent application filed on May 3, 2011 in the Korean Intellectual Property Office and assigned Serial No. 10-2011-0041866, the entire disclosure of which is hereby incorporated by reference.

BACKGROUND OF THE INVENTION

1. Field of the Invention

The present invention relates to a mobile communication system. More particularly, the present invention relates to a delayed acknowledgement transmission method and apparatus for improving communication performance of a system and a terminal by delaying ACKnowledgement (ACK) transmission of the terminal in a handover procedure.

2. Description of the Related Art

In a cellular mobile communication system, as a user moves to a cell edge in a cellular mobile communication system, a terminal releases a connection to a serving cell, or a source cell, and establishes a new connection to a neighboring cell, or a target cell. Such a process, in which the terminal switches the connection from one cell to another according to the terminal's roaming or communication environment change, is referred to as a handover.

FIG. 1 is a diagram illustrating a principle of a handover procedure according to the related art.

Referring to FIG. 1, a mobile communication system includes Mobile Equipment (ME) 100, a router 130, a gateway 140, a Source evolved Node B (SeNB) 115 managing a source cell 110, and a Target eNB (TeNB) 125 managing a target cell 120. The SeNB is also referred to as a serving eNB. The terms "SeNB" and "serving eNB" are used interchangeably herein. The source cell is also referred to as a service cell. The terms "source cell" and "serving cell" are used interchangeably herein.

It is assumed that the ME 100, which has received a data segment from a server 150 via the gateway 140, router 130, and SeNB 115, is transmitting an ACK corresponding to the data segment, before a handover takes place. The ME 100 moves out of the source cell 110 and enters the target cell 120. At this time, the ME 100 receives a Handover Command from the SeNB 115 and performs handover by releasing the connection to the SeNB 115 and establishing a new connection to the TeNB 125.

In the handover procedure of the related art, the ME 100 releases the connection to the SeNB 115 upon receipt of the handover command and sends a handover confirm message to the target to the TeNB 125. If the handover confirm message is received, the TeNB 125 begins path switching. The packets (data segments) arrived at the SeNB 115 after it has transmitted the handover command to the ME 100 are stored at the buffer of the SeNB 115 and are forwarded to the TeNB 125 after the completion of the path switching.

In this process, the same packets are passing the router 130 of the core network twice for a very short time (i.e., twice queuing) thereby causing instant overload. This increases the queue size of the router 130 abruptly, resulting in a packet processing delay or an increase of packet loss probability due to overflow. The packet processing delay or packet loss becomes the reason of the Slow Start and Window Halving in Transmission Control Protocol (TCP), resulting in degradation of TCP performance. This problem becomes more significant in networks with a high density of MEs or high mobility MEs.

As shown in FIG. 1, when forwarding data from the SeNB 115 to the TeNB 125 in a handover procedure, the original packets transmitted by the server 150 and the duplicate packets forwarded by the SeNB 115 are accumulated in the queue of the router 130 simultaneously. As a consequence, the queue of the router 130 overflows instantly so as to cause packet processing delay or packet loss, resulting in TCP timeout.

Therefore, a need exists for an acknowledgement transmission method and apparatus capable of avoiding performance degradation of a router, packet processing delay, and packet loss.

SUMMARY OF THE INVENTION

Aspects of the present invention are to address at least the above-mentioned problems and/or disadvantages and to provide at least the advantages described below. Accordingly, an aspect of the present invention is to provide an acknowledgement transmission method and apparatus capable of avoiding performance degradation of a router, packet processing delay, and packet loss.

In accordance with an aspect of the present invention, an acknowledgement transmission method of a terminal connected to a source base station in a mobile communication system is provided. The method includes transmitting an acknowledgement corresponding to a segment immediately upon receipt of the segment, detecting a delay condition event which is triggered when a difference between a signal strength of the source base station and a neighboring base station is equal to or greater than a predefined offset, calculating, when the delay condition event is detected, a delay value for delaying acknowledgement transmission corresponding to the segment received after detecting the delay condition event, and transmitting the segment received after the detection of the delay condition event by delaying as much as a time corresponding to the delay value.

In accordance with another aspect of the present invention, a terminal for transmitting an acknowledgement in a mobile communication system in which the terminal is connected to a source base station is provided. The terminal includes an event detector for detecting a delay condition event which is triggered when a difference between a signal strength of the source base station and a neighboring base station is equal to or greater than a predefined offset, a delay calculator for calculating, when the delay condition event is detected, a delay value for delaying acknowledgement transmission corresponding to the segment received after detecting the delay condition event, and a radio communication unit for transmitting the acknowledgement corresponding to the segment received before the detection of the delay condition without delay and the acknowledgement corresponding to the segment received after the detection of the delay condition with as much delay as the calculated delay value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Throughout the drawings, it should be noted that like reference numbers are used to depict the same or similar elements, features, and structures.

DETAILED DESCRIPTION OF EXEMPLARY EMBODIMENTS

Figure 1:
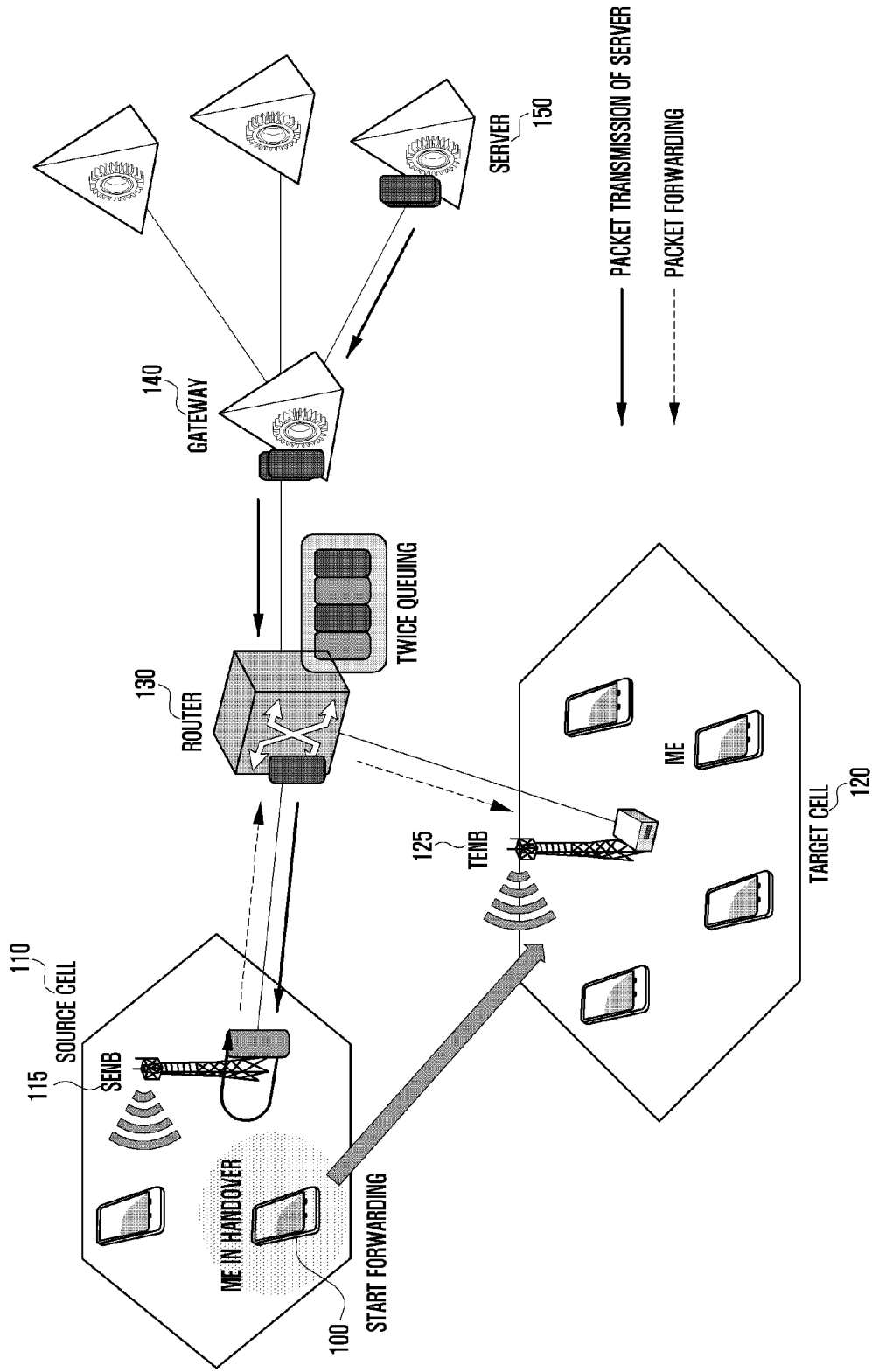
FIG. 1 is a diagram illustrating a principle of a handover procedure according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Some elements may be exaggerated herein, omitted, or simplified in the drawings and, in practice, the elements may have sizes and/or shapes different from those shown in the drawings. The same reference numbers are used throughout the drawings to refer to the same or like parts.

Advantages and features of exemplary embodiments of the present invention and methods of accomplishing the same may be understood more readily by reference to the following description and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

A description is made of the acknowledgement transmission method and apparatus according to exemplary embodiments of the present invention with reference to accompanying drawings hereinafter.

In order to help understand the exemplary embodiments of the present invention, a description is first given of the Long Term Evolution (LTE) measurement event.

FIGS. 2 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 2:
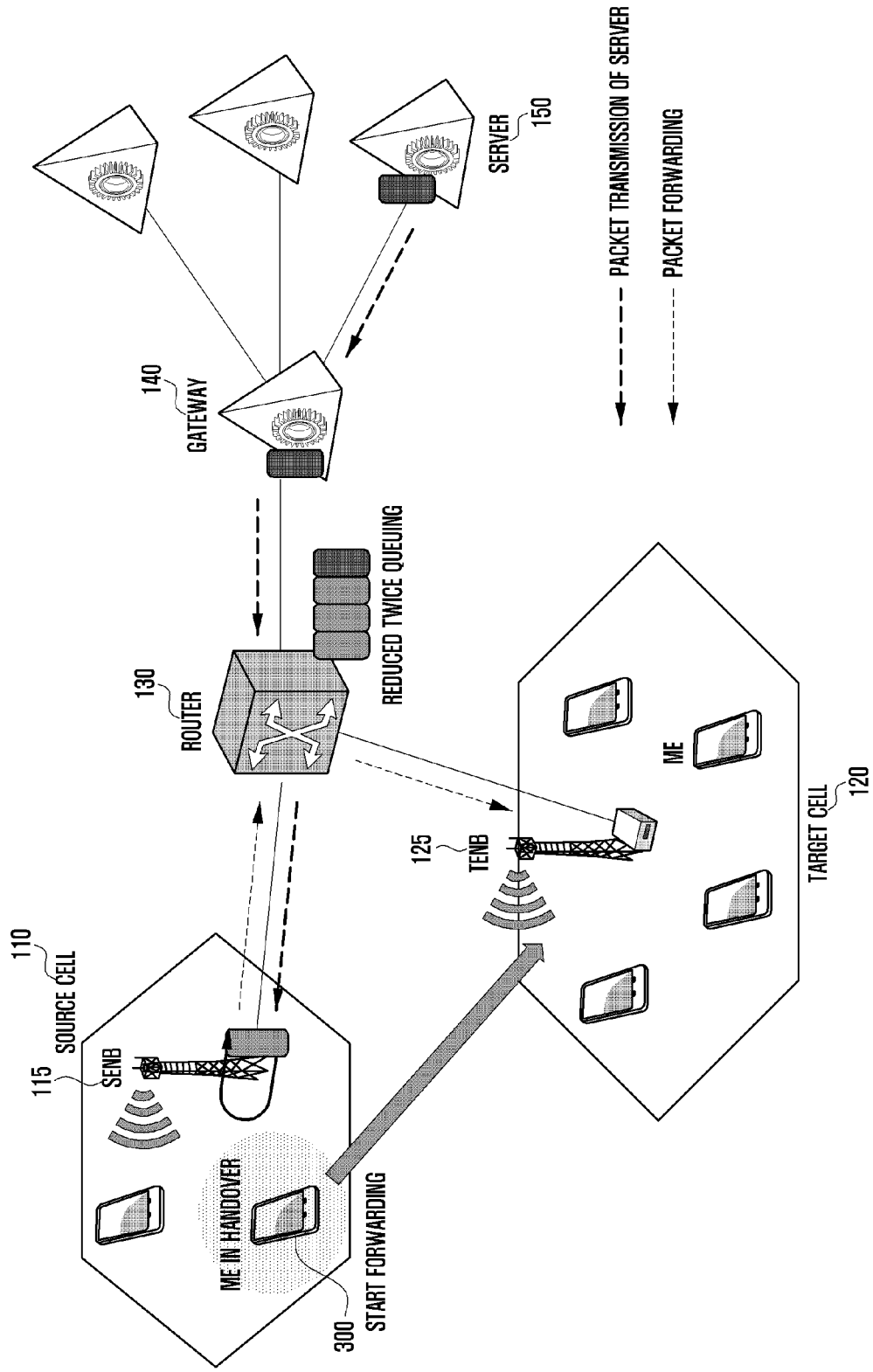
FIG. 2 is a diagram illustrating a principle of a handover procedure according to an exemplary embodiment of the present invention.

FIG. 2 is a diagram illustrating a principle of a handover procedure according to an exemplary embodiment of the present invention.

Referring to FIG. 2, a mobile communication system includes a plurality of a Mobile Equipment (ME) 300, a router 130, a gateway 140, a server 150, a Source evolved Node B (SeNB) 115 for managing a source cell 110, and a Target eNB (TeNB) 125 for managing a target cell 120.

The description is directed to the standard procedure of the intra handover in LTE. However, exemplary embodiments of the present invention is not limited thereto but can be applied to other systems.

Event A1 is triggered when the signal strength of the SeNB 115, which is measured by the ME 300, is equal to or greater than a threshold value. This is the case where the ME 300 is stably connected to the SeNB 115.

Event A2 is triggered when the signal strength of the SeNB 115, which is measured by the ME 300, is equal to or less than a threshold value. This is the case where the ME 300 is connected to the SeNB 115 but the signal strength of the SeNB 115 is not strong enough.

Event A3 is triggered when the signal strength of a neighboring eNB is greater than that of the SeNB 115 and the difference between the signal strengths is equal to or greater than a predefined offset. If the event A3 is detected, the ME 300 predicts that a handover will occur in the near future. Thereafter, the event A4 may be triggered depending on the signal strength of the neighboring eNB.

Event A4 is triggered when the signal strength of the neighboring eNB, which is measured by the ME 300, is equal to or greater than a threshold value.

Event A5 is triggered when the signal strength of the SeNB 115 is equal to or less than a predefined first threshold value and the signal strength of a neighboring eNB is equal to or greater than a predefined second threshold value. Here, the first threshold value is less than the second threshold value. Event A5 is triggered when the ME 300 moves out of the source cell 110 and enters a neighboring cell. If the event A5 is detected, the neighboring eNB becomes the target eNB of a handover such that the User Equipment (UE) detaches from the SeNB 115.

The events A1, A2, A3, A4, and A5 are well-known to those skilled in the art, detailed description thereon is omitted herein.

According to an exemplary embodiment of the present invention, the term "segment" denotes a unit of data used for data transmission. The data is transmitted in a segment unit such that, when a segment is received, the ME acknowledges the receipt of the data segment (hereinafter, referred to as just 'segment') by transmitting an Acknowledgement message (ACK).

There are a few methods proposed for addressing the problems described with reference to FIG. 1.

The first method is called a Fast Path Switching. In this method, the path switching takes place at an early time point to reduce the packet forwarding amount. If the SeNB sends a handover command message to the ME, the Target eNB (TeNB) starts path switching immediately without waiting for a handover confirm message from the ME.

The second method is called a Handover Prediction. In this method, the SeNB predicts a handover using the moving average of the ME and Knowledge Database. The ME sends a Handover Request to a TeNB according to the Handover Prediction rather than according to the handover decision made by the SeNB based on the measurement report sent by the ME.

Both the fast path switching and the handover prediction methods are advantageous to reduce the packet forwarding amount. However, these methods require changes in the handover procedure and function of the eNB of the related art, resulting in system modification for actual application of these techniques. In a case of the handover prediction, its implementation complexity increases in order to secure a stable handover prediction. In a case of the fast path switching, although it has a low operation complexity compared to the handover prediction, the packet forwarding amount reduction efficiency is low too. Furthermore, since both methods are based on the prediction technique, if the handover prediction fails or if a handover cancellation takes place after the transmission of the handover command, the connection may be lost. This means that these methods may cause more loss than gain. An exemplary embodiment of the present invention proposes a method that is capable of reducing TCP performance degradation by adjusting, at the ME, the forwarding packet amount.

Referring again to the related art of FIG. 1, when the SeNB 115 performs data forwarding, the packets transmitted by the server 150 passes the router 130 twice so as to cause congestion of the queue of the router 130, resulting in performance degradation. In an exemplary embodiment of the present invention, if a specific ME 300 is in the middle of data forward as a TCP receiver, the TCP sender, i.e., the server 150, reduces the number of packets transmitted to the corresponding ME 300. That is, ME 300 is configured to send an ACK indicating a delay of the segments received from the server 150 before start of the data forwarding. Accordingly, the packets transmitted by the server 150 arrive at the router 130 with delay. By increasing the transmission period of the new packets at the server 150, it is possible to avoid the overload as described with reference to FIG. 1. This method can be applied without modification of the standard handover procedure and standard TCP procedure as well as the functions of the eNB with the exception of the ME 300. That is, the operations of the eNBs 115 and 125, the router 130, the gateway 140, and the server 150 are identical with those in the system of FIG. 1. A description is made of the configuration and operations of the ME 300 later with reference to FIGS. 3 through 7. In the exemplary embodiment of FIG. 2, if a handover is predicted, the ME 300 sends the server 150 the ACK corresponding to the received segment with an appropriate delay. As a consequence, the server 150 sends a new packet to the ME 300 at an elongated interval. Accordingly, the number of segments accumulated in the queue of the router 130 decreased during the handover procedure so as to avoid performance degradation caused by the excessive number of segments in the queue of the router 130.

Figure 3:
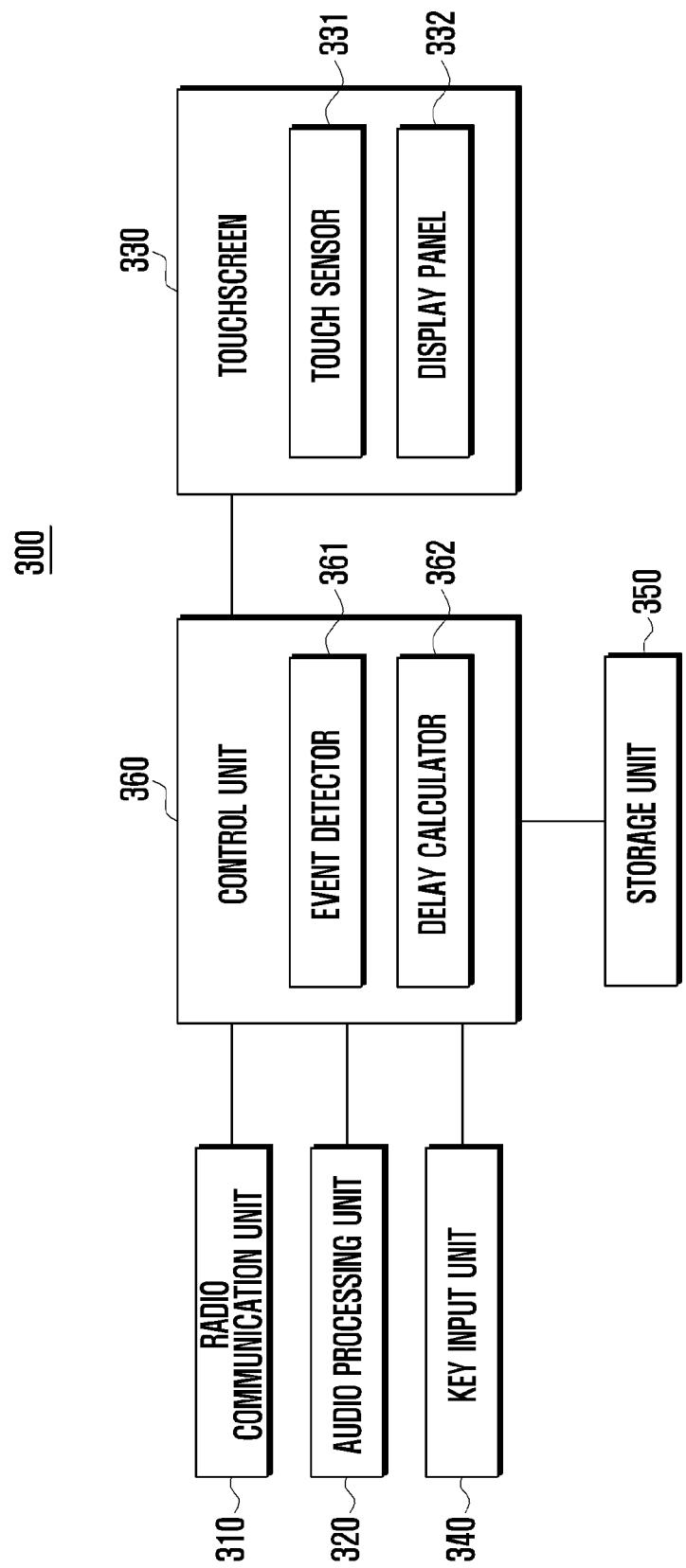
FIG. 3 is a block diagram illustrating a configuration of a Mobile Equipment (ME) according to an exemplary embodiment of the present invention.

FIG. 3 is a block diagram illustrating a configuration of an ME according to an exemplary embodiment of the present invention.

Referring to FIG. 3, an ME 300 includes a radio communication unit 310, an audio processing unit 320, a touchscreen 330, a key input unit 340, a storage unit 350, and a control unit 360.

The radio communication unit 310 is responsible for radio communication to transmit/receive data. The radio communication unit 310 may include a Radio Frequency (RF) transceiver for up-converting and amplifying the transmission signals and an RF receiver for low noise amplifying and down-converting the received signals. The radio communication unit 310 may transfer the data received through a radio channel to the control unit 360 and transmit the data output by the control unit 360 through a radio channel.

The radio communication unit 310 receives a data segment from a server 150 and transmits an ACK to the server in correspondence to the data segment. If an event triggering a handover (e.g., event A3) is detected, the radio communication unit 310 sends the ACK with some delay rather than immediately after the receipt of the data segment. The delayed ACK transmission method is described below with reference to FIGS. 4 through 6. If the handover completes (i.e., the ME detaches from the SeNB 310) or if an event predicting no handover is detected while transmitting the ACK with delay, the ME 300 sends the ACK without delay. The ACK transmissions with and without delay are described with reference to FIGS. 4 through 6.

Audio processing unit 320 may include a codec pack including a data codec for processing packet data and an audio codec for processing audio signals including voice. The audio processing unit 320 converts digital audio signals to analog audio signal by means of the audio codec to output in the form of audible sound wave through a speaker and converts the analog audio signals received through a microphone to digital audio signals by means of the audio codec.

The touchscreen 330 includes a touch sensor 331 and a display panel 332. The touch sensor 331 detects a touch gesture made by the user. The touch sensor 331 may be implemented with one of a capacitive overlay sensor, a resistive overlay sensor, an infrared beam sensor, and a pressure sensor. The touch sensor 331 may also be implemented with other types of sensors that can detect a contact of an object or a pressure. The touch sensor 331 detects a touch input made by the user and generates an input signal to the control unit 360. The input signal includes the coordinates at the position where the touch input is made by the user. If the touch is followed by a movement gesture such that the touch position changes, the touch sensor 331 sends the control unit 360 the input signal including the coordinates on the movement path.

The display panel 332 may be implemented with one of a Liquid Crystal Display (LCD), an Organic Light Emitting Diode (OLED), and an Active Matrix OLED (AMOLED). The display panel 332 provides the user with information including menus, user input data, function configuration and other indications. The display panel 332 is responsible for displaying a booting screen, a standby screen, menu screens, a call progressing screen, and application execution screens.

Although the description is directed to the ME 300 equipped with a touchscreen, the exemplary embodiments of the present invention are not limited thereto. In a case where the present invention is applied to the equipment implemented without touchscreen, the touchscreen 300 depicted in FIG. 3 may operate only with the functions of the display panel 332.

The key input unit 340 receives a key input made by the user for controlling the ME 300 and generates input signal to the control unit 360. The key input unit 340 may be implemented with a keypad having numeric keys and navigation keys and functions formed at a side of the ME 300. According to an exemplary embodiment of the present invention, the touchscreen of the ME 300 may be configured to receive all available input for manipulating ME 300. In this case the key input unit 340 may be omitted.

The storage unit 350 stores program data used for the operation of the ME 300. The storage unit 350 may be divided into a program region and a data region. The program region may store Operating System (OS) for booting the ME 300, programs for controlling the operations of the ME 300, application programs for playing multimedia contents and executing supplementary functions of the ME 300, such as a camera function, an audio playback function, and a still and motion picture playback. The data region stores the data generated in use of the ME 300, such as still and motion pictures, phonebooks, and audio files.

The control unit 360 controls overall operations of the function blocks of the ME 300 and includes an event detector 361 and a delay calculator 362.

The event detector 361 may detect a handover prediction event (i.e., event A3), a handover completion event (i.e., event A5), and an event triggered by the signal strengths of the source and target eNBs 115 and 125. For example, the event detector 361 may detect the LTE measurement events A1, A2, A3, A4, and A5. Although the description is directed to the LTE measurement event, the event detector 361 may be configured to detect a handover occurrence or a handover prediction event.

The delay calculator 362 calculates the delay value to be applied to the segment received after the detection of the handover prediction event (i.e., event A3 or a first event). The delay value calculation procedure is described with reference to FIGS. 4 through 6.

Figure 4:
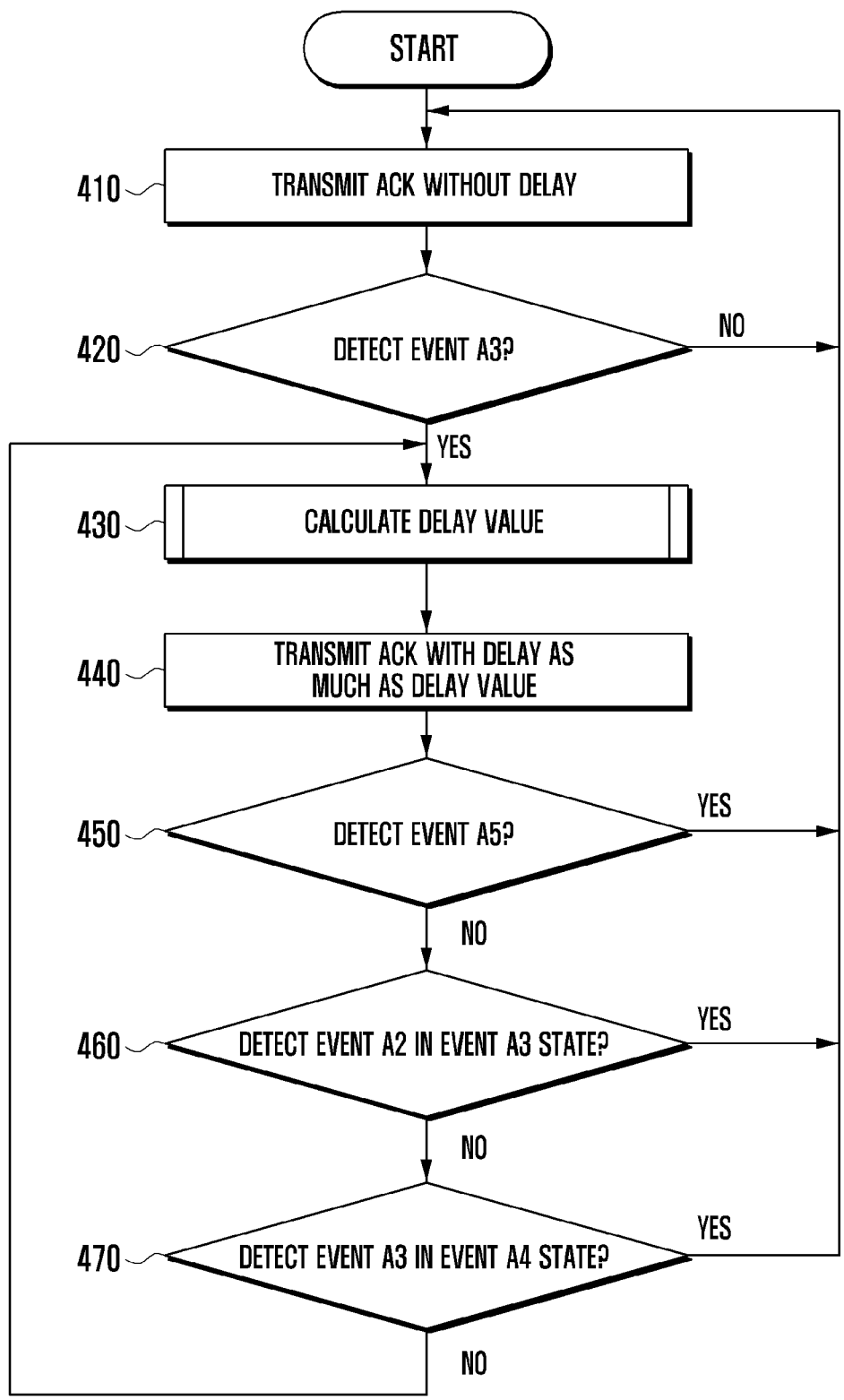
FIG. 4 is a flowchart illustrating an ACKnowledgement (ACK) transmission method according to an exemplary embodiment of the present invention.

FIG. 4 is a flowchart illustrating an ACK transmission method according to an exemplary embodiment of the present invention.

Referring to FIG. 4, the ME 300 transmits the ACK immediately upon receipt of a received segment at step 410. At step 410, the ME 300 is in the state where no handover is in progress or predicted to occur in the near future.

In the state of step 410, the control unit 360 of the ME 300 monitors and determines whether a delay condition trigger event predicting handover occurrence in the near future is detected. The first event may be the event A3 among the LTE measurement events.

The generation and detection of the LTE measurement events A1, A2, A3, A4, and A5 are well-known to those in the art, detailed description thereon is omitted herein.

If the event A3 is detected by the event detector 361 at step 420, the control unit 360 delays the transmission of ACK at step 430. Otherwise, if the event A3 is not detected at step 420, the procedure goes to step 410 to continue normal ACK transmission.

At step 430, the delay calculator 362 calculates the delay value of the ACK transmission corresponding to the segment received after the detection of the event A3. For convenience, it is assumed that a neighboring eNB having the signal strength greater than that of the SeNB 115 is the TeNB 125 when the event A3 is detected.

Figure 5:
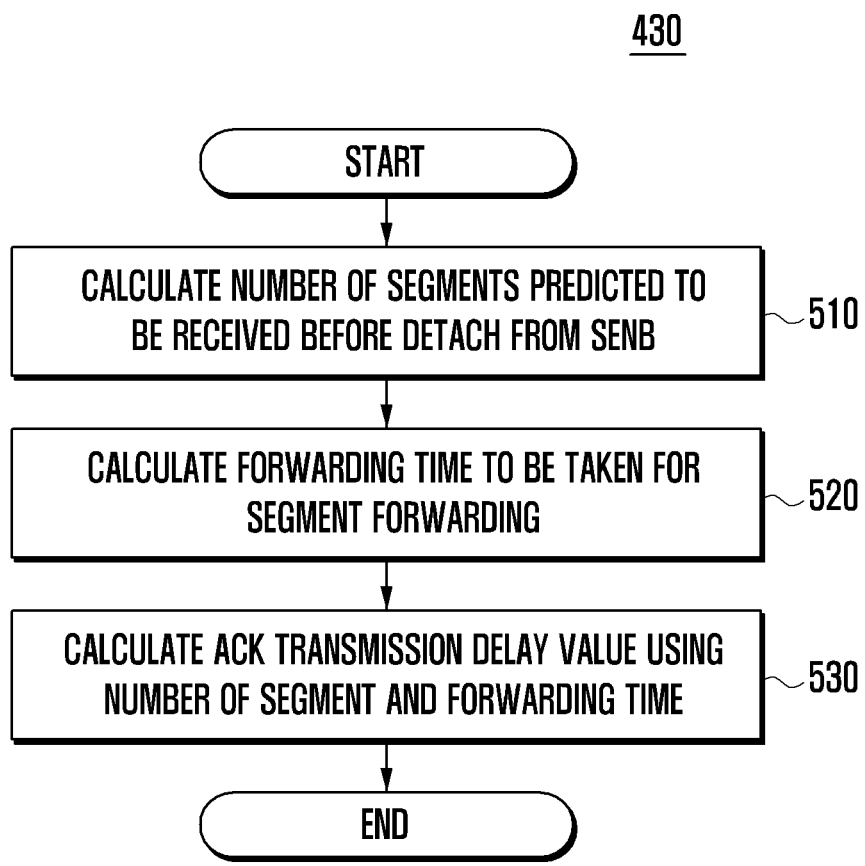
FIG. 5 is a flowchart illustrating a delay calculation step according to an exemplary embodiment of the present invention.

FIG. 5 is a flowchart illustrating a delay calculation step according to an exemplary embodiment of the present invention.

Referring to FIG. 5, the delay calculator 362 calculates the time to be taken for segment forwarding at step 510.

At step 520, the segment (packet) forwarding time ($T_{forwarding}$) is calculated by summing the handover delay ($d_{HO}$) between the detach of the ME 300 from the SeNB 115 and the attach of the ME 300 to the TeNB 125 and the path switching time ($d_{PS}$) required for switching the path between the ME 300 and the server 150 after the handover. This can be expressed by Equation (1):

$$T_{forwarding} = d_{HO} + d_{PS} \quad (1)$$

where $d_{HO}$ can be obtained by Equation (2) and Table 1.

TABLE 1

| Procedure title Connection Control Procedures | N |
|---|---|
| RRC connection establishment | 15 |
| RRC connection release | NA |
| connection re-configuration (radio resource configuration) | 15 |
| connection re-configuration (measurement configuration) | 15 |
| connection re-configuration (intra-LTE mobility) | 15 |
| connection re-establishment | 15 |
| Initial security activation | 10 |
| Paging | NA |
| $T_P$ | ≥85 |

Event A4 is triggered when the signal strength of the neighboring eNB, which is measured by the ME 300, is equal to or greater than a threshold value.

$$d_{HO} = t_{proc(HO)} + t_{interrupt}$$

$$t_{interrupt} = t_{search} + t_{IU} + 20 \text{ (ms)}$$

$$d_{HO} \geq 105 \text{ (ms)} \quad (2)$$

where $t_{proc(HO)}$ denotes the time taken for the operation of table 1, $t_{interrupt}$ denotes the time taken for interrupt, $t_{search}$ denotes the time taken for search of the target cell, $t_{IU}$ denotes a value of uncertainty at the timing between physical channel structures of the source cell 11. $t_{search}$ and $t_{IU}$ are small enough to ignore.

dPS is the sum of the processing delay $t_{proc(PS)}$ required for path switching and the Round Trip Time (RTT) of the packet to the server 150 as expressed by Equation (3):

$$d_{PS} = RTT + t_{proc(PS)} \quad (3)$$

where $t_{proc(PS)}$ is small enough to ignore.

From the above equations, the packet forward time ($T_{forwarding}$) has the following relationship of Equation (4):

$$T_{forwarding} \geq 105 + RTT \quad (4)$$

Thereafter, the delay calculator 362 calculates a number of segments to be received by the ME 300 from the time point when the event A3 has been detected and the ME has detached from the SeNB 115, i.e., until the event A5 takes place.

Assuming that the event A3 detection time point is t, a number of segments received from t-T to the current time point t is defined as $N_T$. If the event A3 takes place, the delay calculator 362 determines $N_T$ by tracking the history for time T.

Figure 6:
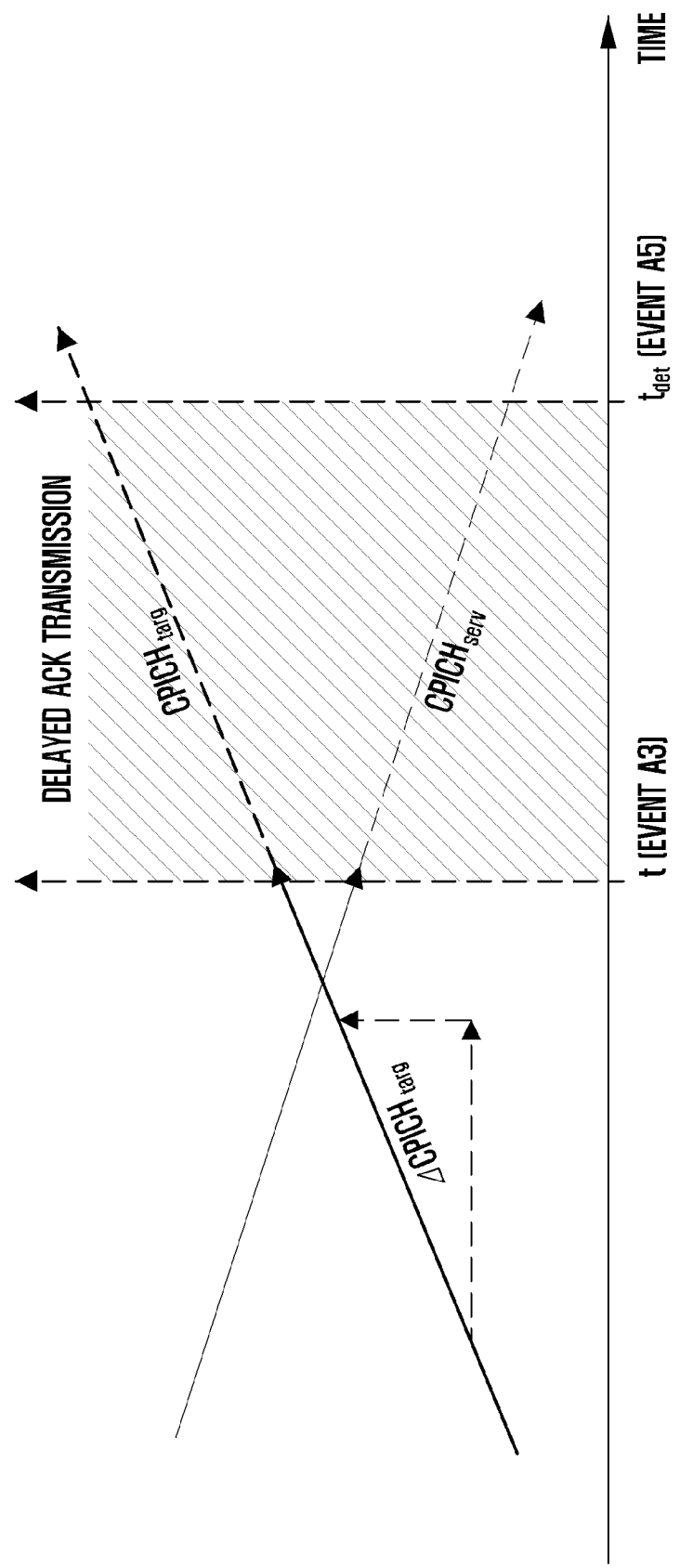
FIG. 6 is a graph illustrating a principle of predicting a handover timing according to an exemplary embodiment of the present invention.

FIG. 6 is a graph illustrating a principle of predicting a handover timing according to an exemplary embodiment of the present invention.

Referring to FIG. 6, if the event A3 is detected, the delay calculator 362 predicts the event A3 time point, i.e., the timing when the handover takes place, based on the signal strengths of the SeNB 115 and the TeNB 125. For example, the delay calculator 362 may predict the event A5 occurrence time point based on the received strengths of Common Pilot Channels (CPICHs) of the SeNB 115 and TeNB 125. The pilot signal strength received from the SeNB 115 at $i^{th}$ slot is referred to as $CPICH_{serv}(i)$. The difference between the SeNB's pilot signal strengths at the $i^{th}$ and $(i-1)^{th}$ slots is referred to as $\Delta CPICH_{serv}(i)$. Similarly, the difference between TeNB's pilot signal strengths at the $i^{th}$ and $(i-1)^{th}$ slots is referred to as $\Delta CPICH_{targ}(i)$.

The delay calculator 362 may predict the event A5 occurrence timing, i.e., the time point $t_{det}$ when the ME 300 detaches from the SeNB 115, based on the SeNB's pilot signal strength displacement $\Delta CPICH_{serv}(i)$ and the TeNB's pilot signal strength displacement $\Delta CPICH_{targ}(i)$. That is, the delay calculator 362 may calculate the time point where the event A5 condition is fulfilled under the assumption that the SeNB's pilot signal strength displacement $\Delta CPICH_{serv}(i)$ and the TeNB's pilot signal strength displacement $\Delta CPICH_{targ}(i)$ are maintained without change.

The delay calculator 362 may calculate the number of segments (N-DI) predicted to be received by the ME 300 for duration $(t, t_{det})$ using Equation (5):

$$N\_DI = N_T/T^*(t_{det}-t) \quad (5)$$

The delay calculator 362 calculates the delay value for delaying the transmission of the ACK corresponding to the segment received since time point t at step 530 using the number of segments predicted to be received, which is calculated at step 510, and the forwarding time calculated at step 520.

The Radio communication unit 310 transmits the ACKs corresponding to N_DI segments received since the time point t by delaying by as much as $d_1, d_2, \ldots, d_{N\_DI}$, respectively.

The delay value $d_{N\_DI}$ of the $N\_DI^{th}$ packet may be calculated by multiplying a scaling factor c ($0<c<1$) with the packet forwarding time.

The respective ACK delay values ($d_1, d_2, \ldots, d_{N\_DI}$) may be calculated by Equations (6) through (8).

SRTT(t) denotes Standard Round Trip Time of the packet at time point t. $RTT^{delayed}_n$ denotes the delayed round trip time of the $n^{th}$ segment received since the time point t. The delayed round trip time of the $n^{th}$ segment is calculated by summing the standard round trip time and the delay value of the corresponding segment as expressed by Equation (6):

$$RTT^{delayed}_1 = SRTT(t) + d_1 \quad (6)$$
$$RTT^{delayed}_2 = SRTT(t) + d_2$$
$$\ldots$$
$$RTT^{delayed}_{N\_DI} = SRTT(t) + d_{N\_DI}$$

In order to make the delayed RTT values a geometric series, the relationship of Equation (7) is required:

$$RTT^{delayed}_N = k^N \times SRTT(t) \quad (7)$$

From Equations (6) and (7), the following Equations (8) are derived.

$$RTT^{delayed}_{N\_DI} = k^{N\_DI} \times SRTT(t) = SRTT(t) + d_{N\_DI}$$

$$d_{N\_DI} = (k^{N\_DI}-1) \times SRTT(t) = c(T_{forwarding})$$

(c: scaling factor)

$$k = (c(T_{forwarding})/SRTT(t))^{1/N\_DI}$$

$$d_1 = (k-1) \times SRTT(t) = ((c(T_{forwarding})/SRTT(t))^{1/N\_DI} - 1) \times SRTT(t) \quad (8)$$

The delay values calculated in this way are used for delaying the transmission of the ACK at step 440 of FIG. 4.

Returning to FIG. 4, the Radio communication unit 310 transmits, at step 440, the ACK corresponding to the segment received after the event A3 detection time point by delaying by as much as the delay value calculated at step 430. The ACKs corresponding to the first to the $N\_DI^{th}$ segments are delayed by as much as $d_1$ to $d_{N\_DI}$, respectively. At the step of calculating the ACK delay value, $t_{det}$ and N_DI are the predicted values, and the number of segments received actually may differ from the prediction. Accordingly, when the number of segments received before the event A5 occurrence time point, the transmission of the ACK corresponding to the segment following the $N\_DI^{th}$ segment may be delayed by as much as $d_{N\_DI}$.

The event detector 361 determines whether one of the delay termination conditions is fulfilled at steps 450 to 470. If one of the delay termination conditions is fulfilled, i.e., one of the delay termination events is detected, the ME terminates the ACK delay transmission mode and transmits the ACK immediately upon receipt of the segments.

The control unit 360 determines whether the event A5 is detected at step 450. If the event A5 is detected, this means that the handover has completed and thus there is no need to delay the ACK transmission any longer. Accordingly, upon detection of the event A5, the control unit 360 returns the procedure to step 410 to transmit the ACK corresponding to the segment, which has been received previously but not yet acknowledged, immediately and the ACKs corresponding to the segments received afterward without delay. If the event A5 is not detected, the procedure goes to step 460.

The control unit 360 determines whether the event A2 is detected in the event A3 state at step 460. If the event A2 is detected in the event A3 state, this means that the event A2 follows the event A3 with the exception of other events. This is the case where the event occurs in a direction opposite to the predicted handover direction. Accordingly, no handover is predicted to occur in the near future and thus the control unit 360 returns the procedure to step 410 to transmit the ACK corresponding to the segment, which has been received previously but not yet acknowledged, immediately and the ACKs corresponding to the segments received afterward without delay. If the event A2 is not detected in the event A3 state, the procedure goes to step 470.

The control unit 360 determines whether the event A3 is detected in the event A4 state at step 470. If the event A3 is detected in the event A4 state, this means that the event A3 follows the event A4 with the exception of other events. This is the case wherein the event progresses in a direction opposite to the predicted handover direction. Accordingly, no handover is predicted to occur in the near future and thus the control unit 360 returns the procedure to step 410 to transmit the ACK corresponding to the segment, which has been received previously but not yet acknowledged, immediately and the ACKs corresponding to the segments received afterward without delay. If the event A3 is not detected in the event A4 state, the procedure goes to step 440 such that the delayed ACK transmission mode is maintained.

FIG. 4 is directed to the case where the delay termination conditions are the event A5 detection, event A3 detection in the event A4 state, and event A2 detection in the event A3 state. However, exemplary embodiments of the present invention may be applied to other cases, e.g., when the ME 400 stops the delayed ACK transmission mode upon receipt of the handover cancellation command from the SeNB 115. In addition, the delayed ACK transmission mode may be terminated when the LTE measurement events take place in opposite order to the above-described order or other events predicting that no handover will occur in the near future are detected.

Figure 7:
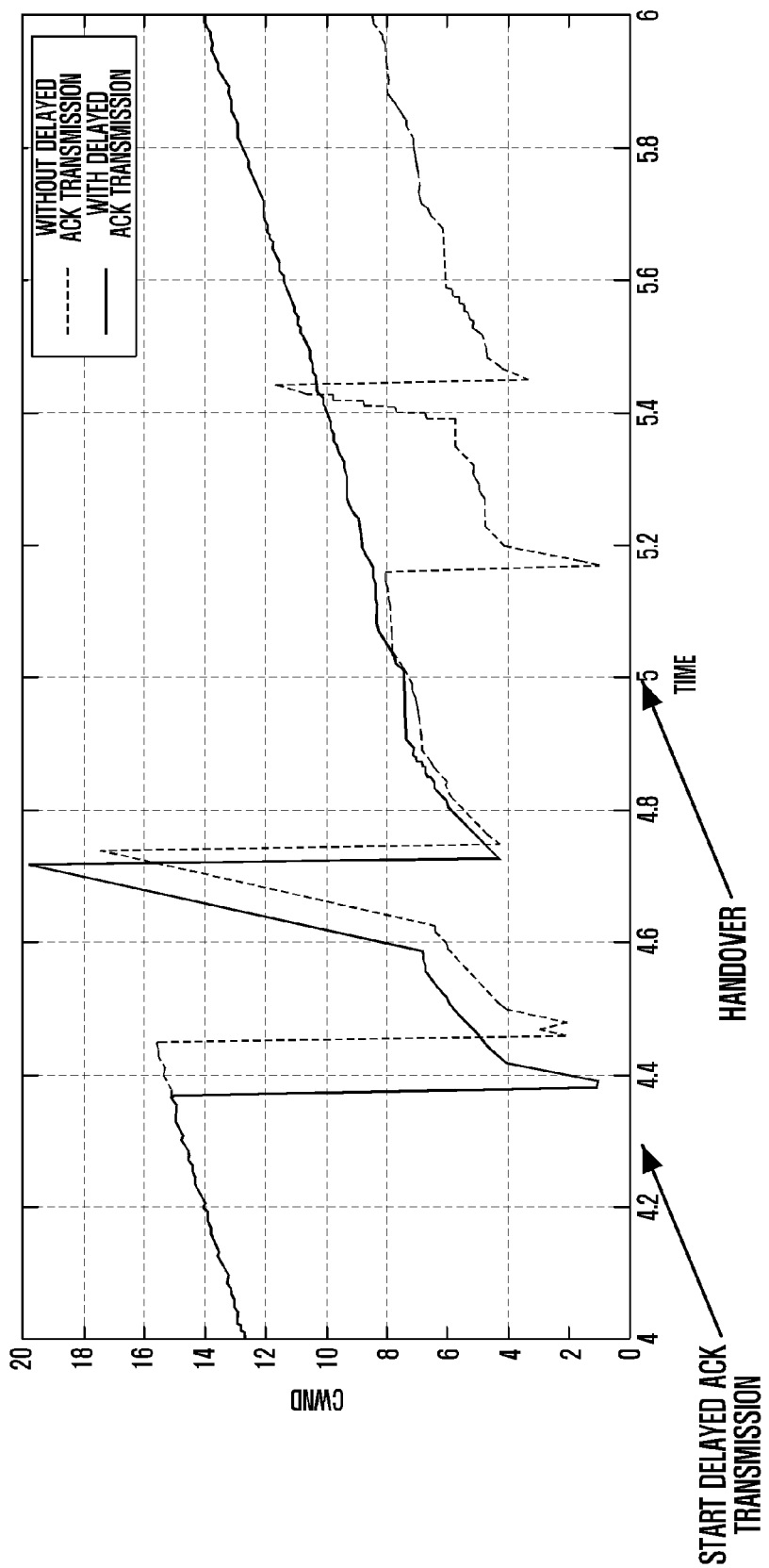
FIGS. 7 and 8 are graphs illustrating simulation results of a system performance with and without a delayed ACK transmission technique in a handover procedure according to an exemplary embodiment of the present invention.
Figure 8:
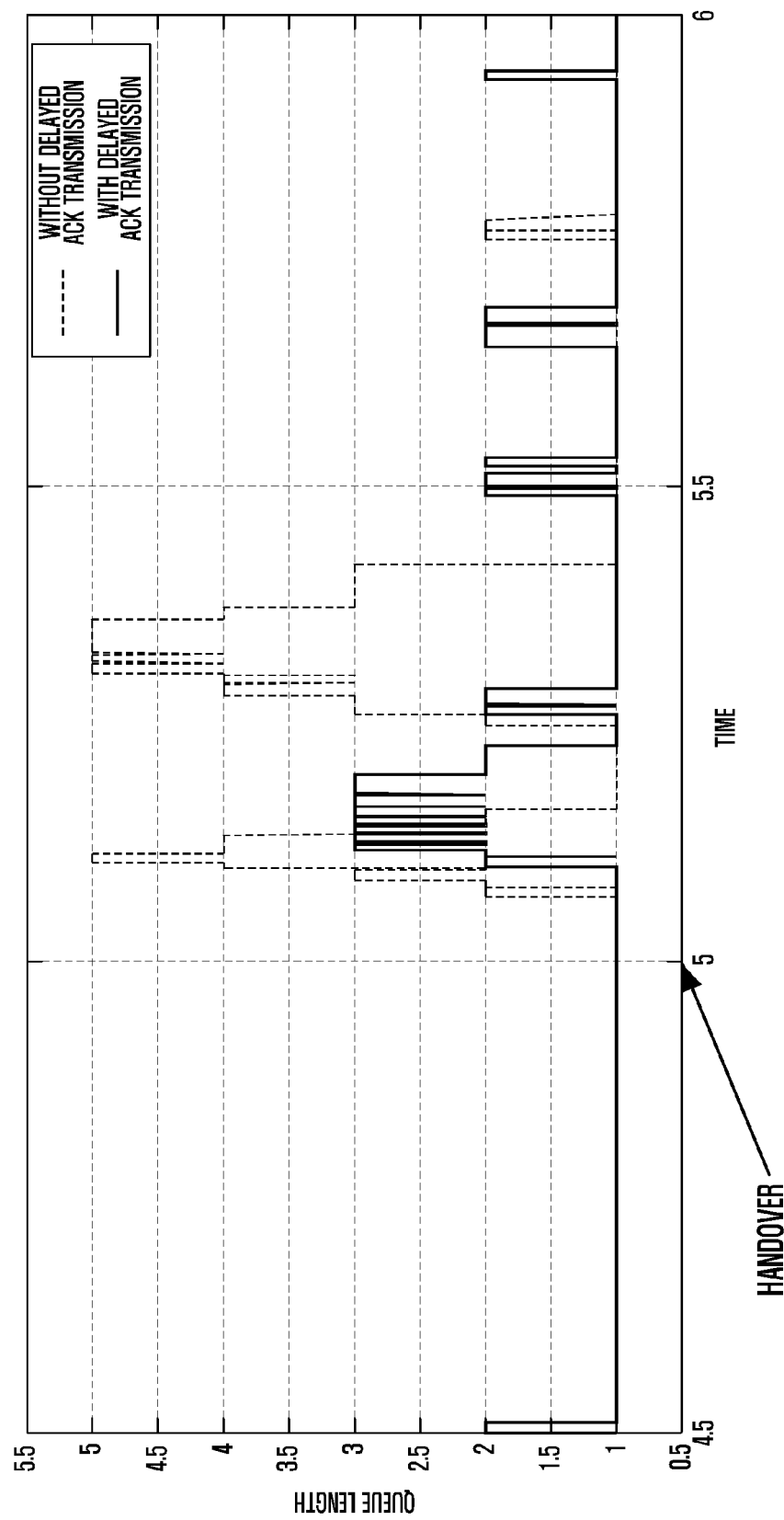

FIGS. 7 and 8 are graphs illustrating simulation results of a system performance with and without a delayed ACK transmission technique in a handover procedure according to an exemplary embodiment of the present invention.

Referring to FIGS. 7 and 8, the simulations have been performed with the following parameters.

C++
Two servers and two MEs
200 packets per second
End-to-end delay≈0.1 second
Router processing delay—5 ms (data), 0.5 ms (ACK)
Initial minimum RTO=1 second In the simulation, the packet forward starts at 5 seconds and stops at 5.3 seconds, and the delayed ACK transmission starts at 4.3 seconds. FIG. 7 shows that the slow start occurs repeatedly since the start of packet forward at 5 seconds when the delayed ACK transmission is not applied. This is because the TCP sender regards the processing delay increasing in proportion to the instant increase of the queue length as a timeout caused by a certain reason, such as packet loss. Since it takes some time for the queue to be stable, the Congestion Window Size (CWND) is not yet stable even after the end of the packet forward at 5.3 seconds. Meanwhile, when the delayed ACK transmission technique is applied, the CWND reached the ceiling value right after the start of the delayed ACK transmission enters the slow-start state earlier than that of the case without the delayed ACK transmission technique, but the CWND increases gradually after the start of the packet forwarding in the congestion avoidance state without entering the slow-start state, while the queue length is maintained stably as shown in FIG. 8. The delayed ACK transmission method and apparatus of the exemplary embodiments of the present invention is capable of improving the packet processing efficiency especially in the situation where the core network is processing handovers of a plurality of terminals, such that the limited queue size of the router causes packet loss.

As described above, the delayed ACK transmission method and apparatus of the exemplary embodiments of the present invention is capable of avoiding router's throughput degradation and reducing the packet transmission delay and packet loss especially in the handover procedure with the packet forwarding.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process, such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in a different order and with several modifications. For example, two successive blocks may be performed substantially at the same time, or may be performed in a reverse order according to their functions.

The term "module" according to the exemplary embodiments of the present invention, means, but is not limited to, a software or a hardware component, such as a Field Programmable Gate Array (FPGA) or an Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented, such that they execute one or more Central Processing Units (CPUs) in a device or a secure multimedia card.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting an acknowledgement message corresponding to a segment by a terminal in a mobile communication system, the method comprising:

determining whether a difference between a strength of a first signal from a source base station and a strength of a second signal from a neighboring base station is equal to or greater than a predefined offset;

calculating, if the difference between the strength of the first signal from the source base station and the strength of the second signal from the neighboring base station is equal to or greater than the predefined offset, a delay value based on a number of segments expected to be received until the terminal detaches from the source base station and based on a forwarding time to be taken for segment forwarding in a handover procedure between the source base station and the neighboring base station;

transmitting an acknowledgement message to which the calculated delay value is applied in response to receiving a segment; and transmitting, when a delay termination event is detected, an acknowledgement message corresponding to a received segment without applying the delay value, wherein the delay termination event includes at least one of detecting an event A5 which is triggered when a signal strength of the source base station is equal to or less than a predefined first threshold value and a signal strength of the neighboring base station is equal to or greater than a predefined second threshold value, an event A2, which is triggered when a signal strength of the source base station is equal to or less than a threshold value, in state of an event A3 which is triggered when a signal strength of the neighboring base station is greater than a signal strength of the source base station and a difference between the signal strengths is equal to or greater than the predefined offset, and the event A3 in state of an event A4 which is triggered when a signal strength of the neighboring base station is equal to or greater than a threshold value, and wherein the calculating of the delay value comprises calculating the number of segments and the forwarding time and obtaining the delay value to be applied to the segment to be received based on the number of segments and the forwarding time.

2. The method of claim 1, further comprising:

transmitting, when a delay termination event is detected, an acknowledgement message corresponding to a segment already received but not yet acknowledged without applying the delay value.

3. The method of claim 1, wherein the delay termination event comprises an event triggered by the terminal detaching from the source base station.

4. The method of claim 1, wherein the strength of the second signal from the neighboring base station is greater than the strength of the first signal from the source base station.

5. A terminal for transmitting an acknowledgement message corresponding to a segment in a mobile communication system, the terminal comprising:

an event detector configured to determine whether a difference between a strength of a first signal from a source base station and a strength of a second signal from a neighboring base station is equal to or greater than a predefined offset;

a delay calculator configured to calculate a delay value based on a number of segments expected to be received until the terminal detaches from the source base station and based on a forwarding time to be taken for segment forwarding in a handover procedure between the source base station and the neighboring base station, if the difference between the strength of the first signal from the source base station and the strength of the second signal from the neighboring base station is equal to or greater than the predefined offset; and a radio communication unit configured to:

transmit an acknowledgement message to which the calculated delay value is applied in response to receiving a segment, and transmit, when a delay termination event is detected, an acknowledgement message corresponding to a received segment without applying the delay value, wherein the delay termination event includes at least one of detecting an event A5 which is triggered when a signal strength of the source base station is equal to or less than a predefined first threshold value and a signal strength of the neighboring base station is equal to or greater than a predefined second threshold value, an event A2, which is triggered when a signal strength of the source base station is equal to or less than a threshold value, in state of an event A3 which is triggered when a signal strength of the neighboring base station is greater than a signal strength of the source base station and a difference between the signal strengths is equal to or greater than the predefined offset, and the event A3 in state of an event A4 which is triggered when a signal strength of the neighboring base station is equal to or greater than a threshold value, and wherein the delay calculator is further configured to calculate the number of segments and the forwarding time, and to obtain the delay value to be applied to the segment to be received based on the number of segments and the forwarding time.

6. The terminal of claim 5, wherein the radio communication unit is further configured to transmit, when a delay termination event is detected, an acknowledgement message corresponding to a segment already received but not yet acknowledged without applying the delay value.

7. The terminal of claim 5, wherein the delay termination event comprises an event triggered by the terminal detaching from the source base station.

8. The terminal of claim 5, wherein the strength of the second signal from the neighboring base station is greater than the strength of the first signal from the source base station.

* * * * *